United States Patent
Curtius et al.

(10) Patent No.: US 7,748,394 B2
(45) Date of Patent: Jul. 6, 2010

(54) DISHWASHER WITH A SYSTEM FOR RECOGNITION OF FILLING LEVEL

(75) Inventors: Georg Curtius, Dillingen (DE); Bernd Hesterberg, Heidenheim (DE); Michael Rosenbauer, Reimlingen (DE); Peter Schweier, Forheim (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 126 days.

(21) Appl. No.: 10/583,697

(22) PCT Filed: Dec. 10, 2004

(86) PCT No.: PCT/EP2004/053404

§ 371 (c)(1),
(2), (4) Date: Jun. 20, 2006

(87) PCT Pub. No.: WO2005/060815

PCT Pub. Date: Jul. 7, 2005

(65) Prior Publication Data

US 2007/0181155 A1    Aug. 9, 2007

(30) Foreign Application Priority Data

Dec. 22, 2003  (DE) ................................. 103 60 561
Apr. 21, 2004  (DE) ........................ 10 2004 019 351

(51) Int. Cl.
*B08B 3/00* (2006.01)
(52) U.S. Cl. ...................................... 134/113
(58) Field of Classification Search .................. 134/113
See application file for complete search history.

(56) References Cited

U.S. PATENT DOCUMENTS

| 3,539,153 A | * | 11/1970 | Cargo et al. ................. 366/146 |
| 4,982,606 A | | 1/1991 | Adamski et al. |
| 5,187,444 A | | 2/1993 | Kumada et al. |
| 6,318,172 B1 | | 11/2001 | Byatt et al. |

FOREIGN PATENT DOCUMENTS

| DE | 28 40 627 | 3/1980 |
| DE | 29 24 556 | 1/1981 |

(Continued)

OTHER PUBLICATIONS

International Search Report PCT/EP2004/053404.

*Primary Examiner*—Michael Cleveland
*Assistant Examiner*—Samuel A Waldbaum
(74) *Attorney, Agent, or Firm*—James E. Howard; Andre Pallapies

(57) ABSTRACT

A dishwasher with a system for filling level recognition may be achieved which reliably determines the fluid level inside the dishwasher without the use of moving parts, whereby the dishwasher is provided with at least one capacitive filling level sensor for recognition of the fluid level of the rinsing fluid contained in the dishwasher, the electrical capacitance of which changes depending on the height of the fluid level. The fluid level in the dishwasher can thus be reliably determined without the need for moving parts and merely by the use of electronic components. The system further permits a non-contact filling level recognition, whereby the filling level sensor and the rinsing fluid do not come into contact.

10 Claims, 1 Drawing Sheet

FOREIGN PATENT DOCUMENTS

| | | |
|---|---|---|
| DE | 30 14 225 | 10/1981 |
| DE | 32 36 291 | 4/1984 |
| EP | 0 066 914 | 12/1982 |
| GB | 1 213 128 | 11/1970 |
| WO | WO 99/25492 | 5/1999 |

* cited by examiner

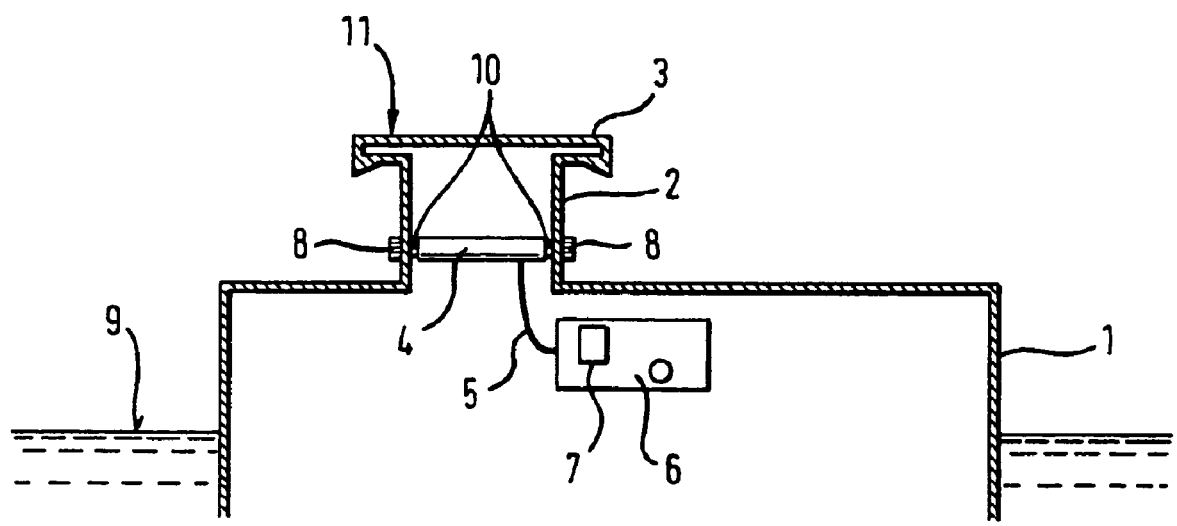

DISHWASHER WITH A SYSTEM FOR RECOGNITION OF FILLING LEVEL

The present invention relates to a dishwasher with a system for recognition of the fluid level of the washing fluid contained in the dishwasher.

BACKGROUND OF THE INVENTION

Dishwashers with devices for filling level recognition are known wherein the fluid level is detected by mechanical means, for example, by floats. In devices of this type, the float floats on the liquid surface as soon as the fluid level in the dishwasher exceeds a certain level. The float is usually mechanically connected to a switch which changes its switching position as a result of the floating movement of the float and passes a corresponding signal to the program control of the dishwasher.

Other systems for detecting the fluid level in a dishwasher work by using a pressure capsule in a communicating pipe system which is compressed as the fluid level rises. The fluid level in the dishwasher can be determined from the extent of the compression of the pressure capsule. The known systems for filling level recognition have the disadvantage that they have a number of mechanically moveable parts which are liable to wear and contamination, for example, by deposited dishwashing residue which can result in tolerance problems to the extent of complete failure of the device for filling level recognition.

SUMMARY OF THE INVENTION

It is the object of the present invention to provide a dishwasher with a system for filling level recognition which reliably determines the fluid level in the dishwasher without using moving parts.

This object is achieved by the dishwasher according to the invention having the features of the exemplary embodiments described herein.

The dishwasher according to the invention comprises at least one washing container for receiving items to be cleaned and a system for recognition of the fluid level of the washing fluid contained in the dishwasher, wherein at least one capacitive filling level sensor is provided whose electrical capacitance changes depending on the height of the fluid level.

An advantage of the dishwasher according to the invention is that the fluid level in the dishwasher can be determined by the system for recognition of the fluid level according to the invention without moving parts and merely by using electronic components. As a result, the system for recognition of fluid level according to the invention is largely not susceptible to wear and contamination by deposited food residues. Since space no longer needs to be taken into account for mechanical devices, another advantage of the system for recognition of fluid level according to the invention is that it only requires a very small amount of space and thus can be accommodated almost arbitrarily even in inaccessible locations in the dishwasher. The system according to the invention further allows non-contact filling level recognition where the rinsing liquid and the filling level sensor do not come into contact, which will be explained in detail in the following description.

The washing fluid used in dishwashers corresponds to a solution mixed with cleaning agents, which substantially consists of water. Water has a relative dielectric constant of $\varepsilon_w=81$ which differs significantly from the dielectric constant of air ($\varepsilon_L=1$). This significant difference between the dielectric constants of water and air is used as the physical basis in the system for filling level recognition according to the present invention to determine the fluid level in the dishwasher. For this purpose, the filling level sensor is constructed in the fashion of a capacitor whose electrical capacitance varies depending on the dielectric constant of the medium surrounding the filling level sensor. The variation in the electrical capacitance of the filling level sensor according to the invention is based on the physical law that in addition to the capacitor area and its spacing, the electrical capacitance of a capacitor depends on the dielectric constant of the medium or the dielectric that is located in the electromagnetic field formed between the capacitor surfaces. These relationships can be represented by the following equation where C is the electrical capacitance of the capacitor, A is the capacitor area, d is the distance between the capacitor surfaces and $\varepsilon$ is the dielectric constant of the dielectric:

$$C=\varepsilon A/d.$$

If the dielectric or the medium which is located in the electromagnetic field between the capacitor surfaces, changes, the factor of the dielectric constant $\varepsilon$ also varies. Since the other factors in the aforesaid equation remain unchanged, the capacitance of the capacitive filling level sensor varies in direct proportion to the variation in the dielectric constant of the dielectric.

This means in the specific application according to the present invention that the electrical capacitance of the capacitive filling level sensor is approximately increased by a factor of 81 when the filling level sensor is surrounded by water instead of air, i.e. water instead of air is the dielectric. According to a preferred embodiment of the invention, this change in capacitance can be evaluated using an electronic circuit connected to the capacitive filling level sensor. Since the electrical capacitance of the capacitive filling level sensor with water or air as the dielectric is known beforehand, it can be uniquely determined by means of the electronic circuit whether the filling level sensor is surrounded by water or air.

The capacitive filling level sensor is appropriately disposed in the dishwasher such that one or more specific fluid levels of the washing fluid in the dishwasher can be determined by the filling level sensor or it can be determined if this fluid level is exceeded or fallen below. It is also possible to allocate gradations of the change in capacitance of the filling level sensor to specific fluid levels of the washing liquid in the dishwasher so that it is possible to determine not only whether certain fluid levels have been overshot or undershot, but also the exact height of the fluid level in the washing container of the dishwasher can be determined using the capacitive filling level sensor according to the invention.

The physical effect of the change in the capacitance of the capacitive filling level sensor described above can be further explained by the fact that the charge carriers at the filling level sensor adopt a stable charge distribution after a certain response time as long as the external conditions do not change. As soon as the medium surrounding the filling level sensor changes, for example as a result of a rise in the washing fluid in the washing container of the dishwasher, the distribution of the charge carriers at the filling level sensor changes, this being detected by an electronic circuit. In this case, it is advantageous if the filling level sensor especially reacts to the relative dielectric constant of water. Stabilising the capacitive filling level sensor to the dielectric constant of water is advantageous in the present application since aqueous solutions are used as the washing fluid in dishwashers and thus the fluid level can be determined exactly.

In a further preferred embodiment of the present invention, the filling level sensor comprises at least one, e.g. two active sensor surfaces at which an electromagnetic field can be formed which varies as a function of the dielectric constant of the medium surrounding the sensor surfaces. The active sensor surfaces are preferably located in an opposite position, so that an electromagnetic field which is as homogeneous as possible can be formed between them, whose variation can easily be detected. At least one active sensor surface is required and other parts in the washing container can also function as sensor surfaces. Thus, two sensor surfaces are available.

It is particularly advantageous if the filling level sensor is located outside the washing container and the filling level sensor or its sensor surfaces is isolated from the rinsing liquid preferably by the wall of the washing container. In this way, the filling level sensor can be effectively protected from the harmful effects of washing liquid and washing residue or cleaning agents contained therein. This ensures reliable and permanent function of the system for filling level recognition according to the invention.

In the preceding embodiment of the invention, the filling level sensor is arranged outside the washing container so that the wall of the washing container lies between the filling level sensor and the washing liquid so as to protect the filling level sensor from harmful influences of washing liquid. In order not to impair the accuracy when determining the fluid level through the wall of the washing container however, in a further preferred embodiment at least one sensor probe made of electrically conducting material is provided inside the washing container so that an electromagnetic field can be formed between the sensor probe and the filling level sensor, wherein the electromagnetic field varies depending on the height of the liquid level or varies depending on the dielectric constant of the medium surrounding the sensor probe. By attaching a sensor probe on the side of the medium to be detected, that is inside the washing container. The sensitivity of the filling level sensor and thus the accuracy when determining the liquid level in the washing container can be enhanced. Whereas the active sensor surface of the filling level sensor is arranged on the outside on the wall of the washing container, the sensor probe is, compared with the active surface of the filling level sensor, located on the inside of the wall of the washing container and therefore in the interior of the washing container.

In the embodiment described above, the electrically conducting body of the sensor probe is consequently attached so that it is insulated with respect to an active sensor surface of the filling level sensor preferably by the wall of the washing container. The advantage of this arrangement is that in this case, the active sensor surface of the filling level sensor and the sensor probe form an electric opposite pole between which an electromagnetic field can be formed which varies depending on the medium surrounding the sensor probe. The insulation is produced by the wall of the washing container located between the filling level sensor and the sensor probe. When the fluid to be detected comes in contact with the sensor probe, the electrical change distribution at the filling level sensor changes to which the capacitive filling level sensor reacts. The active sensor surface of the filling level sensor is in turn located outside the washing container filled with the washing fluid and as a result does not come in directed contact with the washing fluid. The advantage of capacitive filling level measurement is consequently that the water level can be detected through the electrically non-conducting container wall.

In a further preferred embodiment of the present invention, the electrical capacitance of the filling level sensor and its variation is detected preferably qualitatively and quantitatively using electrical means, i.e. the filling level sensor and the electrical circuit connected thereto not only detects whether a certain fluid level is reached, overshot, or undershot but preferably also detects the exact height of the fluid level. The electronic circuit can be implemented in a particularly practical manner in the form of one or more integrated circuits which are favourable to manufacture and require little space.

In order to avoid undetermined recognition states, a certain limiting value of the electrical capacitance of the filling level sensor can appropriately be determined in the electronic circuit to discriminate between whether the filling level sensor is located in the proximity of a medium having a high or low dielectric constant or whether the filling level sensor is surrounded by an aqueous fluid or by air.

The present invention is explained in detail hereinafter using a preferred embodiment with reference to the appended drawings.

BRIEF DESCRIPTION OF THE DRAWINGS

FIG. 1 illustrates a cross-sectional view of a portion of a dishwasher timing a system for recognition of the level according to all exemplary embodiment of the invention.

DETAILED DESCRIPTION OF THE EXEMPLARY EMBODIMENTS OF THE PRESENT INVENTION

FIG. 1 shows a cross section through a part of the sump of a dishwasher having a system for filling level recognition according to the present invention in a preferred embodiment. Since the sump forms the lower part of the washing container in which the washing fluid contained in the dishwasher collects, the sump is a particularly suitable location for the location of the system for filling level recognition in the dishwasher. FIG. 1 only shows the part of the sump which is embodied in the form of an upward elevation 1. In the situation shown in the drawing, the elevation 1 in the sump is surrounded by washing fluid, the fluid level 9 being in the lower area of the sump of the dishwasher.

Constructed in the upper area of the elevation 1 is a dome 11 where the walls 2 of the sump, the elevation 1 and the dome 11 are each integrally interconnected and thus form the wall 2 of the washing container in its lower range. As a result, the interiors of the sump, the elevation 1 and the dome 11 are interconnected and protected from washing fluid which flushes around the dome 11 and the elevation 1. Located in the interior of the dome 11 is a filling level sensor 4. The filling level sensor 4 is constructed in the form of a straight rod having an active sensor surface 10 at its opposite ends. During operation of the system for filling level recognition, a certain charge carrier distribution is established at the active sensor surfaces 10 which varies depending on the level 9 of the washing fluid in the dishwasher. That is, if the medium surrounding the active sensor surfaces 10 changes, for example, as a result of a rise in the washing fluid in the washing container of the dishwasher, the charge carrier distribution at the filling level sensor 4 also varies. Both the absolute and the relative change in the charge carrier distribution at the filling level sensor 4 can be used as a direct measure for determining the variation of the absolute level 9 of the washing fluid in the dishwasher.

The active sensor surfaces 10 of the filling level sensor 4 each adjoin the inside of the wall 2 so that the active sensor surfaces 10 of the filling level sensor 4 are always separated from the washing fluid by the wall 2. In this way, the filling level sensor 4 can be protected from the disturbing effects of the washing fluid and dishwashing residues or detergents contained therein, ensuring reliable and permanent functioning of the system for filling level recognition according to the invention.

Respectively one sensor probe 8 is arranged on the side of the wall 2 opposite to the active sensor surfaces 10. Consequently, the active sensor surfaces 10 and the filling level sensor 4 are disposed on the "dry" side on the wall 2 of the washing container whereas the sensor probes 8 are located directly opposite the active sensor surfaces 10 of the filling level sensor 4 on the side of the wall 2 of the washing container flushed with washing fluid and thus in the interior of the washing container. By attaching the sensor probes 8 inside the washing container, the sensitivity of the filling level sensor 4 and thus the accuracy when determining the liquid level 9 in the washing container is enhanced.

The sensor probes 8 consist of an electrically conducting material so that an electromagnetic field can be formed between the sensor probes 8 and the filling level sensor 4. This electromagnetic field varies depending on the dielectric constant of the medium surrounding the sensor probes 8 and therefore depending on the fluid level 9 of the washing fluid in the dishwasher. As soon as the fluid level 9 of the washing fluid in the dishwasher rises or the washing fluid contacts the sensor probes 8, the electrical charge distribution on the filling level sensor 4 or its electrical capacitance varies.

The filling level sensor 4 is connected to an electronic circuit 6 by means of an electrical lead 5 which detects and evaluates the variation of the charge distribution of the filling level sensor 4 or the variation of its electrical capacitance. The electronic circuit appropriately comprises one or more integrated circuits 7 which are specially programmed to evaluate the signals delivered by the filling level sensor 4. The result of this evaluation is passed on to the program control of the dishwasher which, if necessary, initiates measures to change the level of the washing fluid in the dishwasher, such as opening a valve for supplying fresh water or activating the discharge pump for pumping away washing fluid from the dishwasher.

The dome 11 is constructed on its upper side in the form of a overhanging roof 3 which serves to protect the sensor probes 8 from spray water. The spray water protection 3 is used to avoid incorrect measurements of the system for filling level recognition which could be caused by washing fluid spraying onto the sensor probes 8 during washing operation for example. In this way, it is ensured that only the actual fluid level 9 of the washing fluid in the dishwasher is determined by the system for filling level recognition.

The system according to the invention can detect a certain fluid level by means of capacitive sensors with high accuracy, the active sensor surfaces 10 and the filling level sensor 4 being completely galvanically decoupled from the medium to be detector. Thus, a teaching is provided to use capacitive sensor systems for water level recognition in dishwashers.

REFERENCE LIST

1 Elevation in sump of dishwasher
2 Wall of sump or washing container
3 Spray water protection
4 Filling level sensor
5 Electrical connection between filling level sensor 4 and electronic circuit
6 Electronic circuit
7 Integrated circuit
8 Sensor probes of filling level sensor 4
9 Liquid level of washing fluid in dishwasher
10 Active sensor surfaces of filling level sensor 4
11 Dome of elevation

The invention claimed is:

1. A dishwasher comprising:
   at least one washing container for receiving items to be handled, with the items to be handled being subjected to an operative handling cycle including at least one of a washing step and a rinsing step wherein the washing step includes introduction of a cleaning agent and a fluid carrier forming a washing fluid and the rinsing step includes introduction of a rinsing fluid; and
   a system for recognition of the fluid level of the washing fluid contained in the dishwasher, the fluid level recognition system having at least one capacitive filling level sensor having at least two probes, forming two capacitor plates, each operatively coupled to a sensor surface and projecting into the washing container for operative contact with the washing fluid, thereby using the washing fluid as a dielectric having a dielectric constant that changes with the fill level of the washing fluid,
   wherein at a first fill level the probes and the washing fluid form a capacitor having a first capacitance value indicating a first fill level and causing the filling level sensor to sense the first fill level and at a second fill level the probes and the washing fluid form a capacitor having a second capacitance value indicating a second fill level and causing the filling level sensor to sense the second fill level,
   wherein at least one sensor probe made of electrically conducting material is provided inside the washing container and an electromagnetic field can be formed between the sensor probe and the filling level sensor, wherein the electromagnetic field varies depending on the height of the liquid level or varies depending on the dielectric constant of the medium surrounding the sensor probe, and
   wherein the at least one sensor probe is arranged such that it is separated with respect to an active sensor surface of the filling level sensor by a wall of the washing container.

2. The dishwasher according to claim 1, wherein the filling level sensor is in the form of a capacitor whose electrical capacitance varies depending on the dielectric constant of the medium surrounding the filling level sensor.

3. The dishwasher according to claim 1, wherein the filling level sensor reacts to the relative dielectric constant of water.

4. The dishwasher according to claim 1, wherein the filling level sensor includes at least two opposite active sensor surfaces at which an electromagnetic field can be formed that varies as a function of the dielectric constant of the medium surrounding the sensor surfaces.

5. The dishwasher according to claim 1, wherein the filling level sensor is located outside the washing container, the filling level sensor has a selected one of at least one sensor surface and no sensor surfaces, and the filling level sensor and its respective sensor surfaces are isolated from the rinsing liquid by the wall of the washing container.

6. The dishwasher according to claim 1, wherein the electrical capacitance of the filling level sensor and its variation is detected using electrical means by at least one of a detection in a qualitative manner and a detection in a quantitative manner.

7. The dishwasher according to claim 1 and further comprising electronic storage means in which at least one reference value can be stored which corresponds to an electrical capacitance of the filling level sensor at a specific fluid level.

8. The dishwasher according to claim 1, wherein a certain limiting value of the electrical capacitance of the filling level sensor is specified to discriminate between whether the filling level sensor is located in the proximity of a medium having a high or low dielectric constant or whether the filling level sensor is surrounded by an aqueous fluid or by air.

9. The dishwasher according to claim 1, wherein the at least one sensor probe that is provided inside the washing container is disposed on a first side of the wall of the washing container, the first side being exposed to the washing fluid, and
   wherein the active sensor surface of the filling level sensor is located outside the washing container and on a second, opposite side of the wall of the washing container, the second, opposite side being isolated from exposure to the washing fluid by the wall of the washing container.

10. A dishwasher comprising:
   at least one washing container for receiving items to be handled, with the items to be handled being subjected to an operative handling cycle including at least one of a washing step and a rinsing step wherein the washing step includes introduction of a cleaning agent and a fluid carrier forming a washing fluid and the rinsing step includes introduction of a rinsing fluid; and
   a system for recognition of a fluid level of the washing fluid contained in the dishwasher, the fluid level recognition system having at least one capacitive filling level sensor having an electrical capacitance that changes as a function of a height of the fluid level,
   wherein at least one sensor probe made of electrically conducting material is provided inside the washing container and an electromagnetic field can be formed between the sensor probe and the filling level sensor, wherein the electromagnetic field varies depending on the height of the liquid level or varies depending on a dielectric constant of a medium surrounding the sensor probe, and
   wherein the at least one sensor probe is arranged such that it is separated with respect to an active sensor surface of the filling level sensor by a wall of the washing container.

* * * * *